(12) United States Patent
Itogawa

(10) Patent No.: US 9,596,364 B2
(45) Date of Patent: *Mar. 14, 2017

(54) INFORMATION PROCESSING APPARATUS, INFORMATION PROCESSING SYSTEM, INFORMATION PROCESSING METHOD, AND RECORDING MEDIUM

(71) Applicant: Akira Itogawa, Kanagawa (JP)

(72) Inventor: Akira Itogawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/946,317

(22) Filed: Nov. 19, 2015

(65) Prior Publication Data

US 2016/0080584 A1 Mar. 17, 2016

Related U.S. Application Data

(63) Continuation of application No. 14/557,797, filed on Dec. 2, 2014, now Pat. No. 9,232,081.

(30) Foreign Application Priority Data

Dec. 12, 2013 (JP) .................................. 2013-256695
Oct. 14, 2014 (JP) .................................. 2014-209826

(51) Int. Cl.
  *H04N 1/00* (2006.01)
  *H04N 1/21* (2006.01)
  *G06F 3/12* (2006.01)

(52) U.S. Cl.
  CPC ....... *H04N 1/00068* (2013.01); *G06F 3/1221* (2013.01); *G06F 3/1254* (2013.01);
  (Continued)

(58) Field of Classification Search
  USPC ........................................................ 358/1.15
  See application file for complete search history.

(56) References Cited

U.S. PATENT DOCUMENTS

2011/0191609 A1*  8/2011  Van Bokhoven ..... G06F 1/3206
                                                       713/310
2011/0310423 A1* 12/2011  Motosugi ........... H04N 1/00355
                                                       358/1.13
2014/0307283 A1* 10/2014  Kamisuwa ........... B41M 7/0009
                                                       358/1.14

FOREIGN PATENT DOCUMENTS

JP    2010-097391 A    4/2010
JP    2013-058901 A    3/2013

OTHER PUBLICATIONS

Kami Yasuyuki, Control Device and Control Program, Mar. 28, 2013, Machine Translated Japanese Patent Application Publication, JP2013058901, All Pages.*

(Continued)

*Primary Examiner* — Ngon Nguyen
(74) *Attorney, Agent, or Firm* — Harness, Dickey & Pierce, P.L.C.

(57) ABSTRACT

An information processing apparatus includes a receiver configured to receive an output instruction to output data; a calculator configured to calculate an index value indicating a cost or an environmental burden when data subjected to output are output in a first output condition specified by the output instruction, and the index value when the data are output in a second output condition differing from the first output condition; and a display controller configured to display a screen to display a calculation result obtained by the calculator and to receive an output instruction based on one of the first and the second output conditions.

15 Claims, 14 Drawing Sheets

(52) U.S. Cl.
CPC .......... *G06F 3/1256* (2013.01); *G06F 3/1285* (2013.01); *G06F 3/1286* (2013.01); *G06F 3/1287* (2013.01); *H04N 1/00005* (2013.01); *H04N 1/00076* (2013.01); *H04N 1/00832* (2013.01); *H04N 1/00899* (2013.01); *H04N 1/21* (2013.01); *H04N 2201/0094* (2013.01); *Y02B 60/1271* (2013.01)

(56) References Cited

OTHER PUBLICATIONS

Kami Yasuyuki, Control Device and Control Program, Mar. 28, 2013, Machine Translated Japanese Patent Application Publication, JP 2013058901, All pages.

* cited by examiner

FIG.5

| USER NAME | SIMULATION CONDITION |
|---|---|
| YAMADA | DEFAULT |
| | AGGREGATION (DOUBLE SIDED, 2 IN 1) |
| | ANOTHER APPARATUS WITHIN NETWORK |
| SUZUKI | DEFAULT |
| | DISPLAY (PROJECTOR A) |
| | DISPLAY (TABLET B) |
| TANAKA | DEFAULT |
| ⋮ | ⋮ |

FIG.8

| MODEL NAME | SHEET SIZE | COLOR/ MONOCHROME | SINGLE-SIDED/ DOUBLE-SIDED | ELECTRIC POWER CONSUMPTION FOR FIRST SHEET [Wh] | ELECTRIC POWER CONSUMPTION FOR SECOND SHEET ONWARD [Wh] |
|---|---|---|---|---|---|
| COPIER 1 | A4 PORTRAIT | MONOCHROME | SINGLE-SIDED | 2.1 | 1.9 |
| COPIER 1 | A4 PORTRAIT | MONOCHROME | DOUBLE-SIDED | 2.4 | 2.2 |
| COPIER 1 | A4 LANDSCAPE | MONOCHROME | SINGLE-SIDED | 2.2 | 2.0 |
| COPIER 1 | A4 LANDSCAPE | MONOCHROME | DOUBLE-SIDED | 2.5 | 2.3 |
| COPIER 2 | A4 PORTRAIT | MONOCHROME | SINGLE-SIDED | 2.8 | 2.5 |
| COPIER 2 | A4 PORTRAIT | MONOCHROME | DOUBLE-SIDED | 3.1 | 2.8 |
| COPIER 2 | A4 PORTRAIT | COLOR | SINGLE-SIDED | 3.6 | 3.3 |
| COPIER 2 | A4 PORTRAIT | COLOR | DOUBLE-SIDED | 4.3 | 4.0 |
| ⋮ | ⋮ | ⋮ | ⋮ | ⋮ | ⋮ |

FIG.9

| SHEET TYPE | SHEET UNIT COST [Yen] | $CO_2$ EMISSIONS [kg] |
|---|---|---|
| A4/NORMAL SHEET | 1.9 | 0.014 |
| ... | ... | ... |
| : | : | : |

FIG.10

| CONVERSION CONTENT | CONVERSION RATE |
|---|---|
| ELECTRIC POWER [Wh] → PRICE [Yen] | 0.025 |
| ELECTRIC POWER [Wh] → $CO_2$ EMISSIONS [kg] | 0.036 |

FIG.14

| MODEL NAME | PERSONAL FLAG | ELECTRIC POWER CONSUMPTION [W] |
|---|---|---|
| PROJECTOR A | FALSE | 240 |
| TABLET B | TRUE | 5 |
| ... | | |

INFORMATION PROCESSING APPARATUS, INFORMATION PROCESSING SYSTEM, INFORMATION PROCESSING METHOD, AND RECORDING MEDIUM

This application is a continuation application of U.S. application Ser. No. 14/557,797, filed on Dec. 2, 2014, which claims priority under 35 U.S.C. §119 to Japanese Patent Application No. 2014-209826 filed on Oct. 14, 2014 and Japanese Patent Application No. 2013-256695 filed on Dec. 12, 2013, in the Japanese Patent Office, the entire contents of each of which are hereby incorporated by reference herein.

BACKGROUND OF THE INVENTION

1. Field of the Invention

The disclosures discussed herein relate to an information processing apparatus, an information processing system, an information processing method, and a recording medium storing an information processing program.

2. Description of the Related Art

There has been significant growth in the demand of technologies to reduce costs relating to apparatus usages in offices with a background in environmental considerations and unstable electrical power supply due to natural disaster.

For example, attempts have been made to collect information on electric power consumption of apparatuses used in the office and the like to visualize such information. The visualized electric power consumption may serve as effective materials for planning a proposal to reduce electric power consumption.

However, in such approaches, the collected data will not provide users with specific reports of costs and environmental burdens that are actually imposed on the users.

RELATED ART DOCUMENT

Patent Documents

[Patent Document 1] Japanese Laid-open Patent Publication No. 2013-058901

SUMMARY OF THE INVENTION

Accordingly, it is a general object in one embodiment of the present invention to provide an information processing apparatus, a method for processing information, and a program product for implementing information processing capable of easily reproducing various statuses of an apparatus subject to emulation that substantially obviate one or more problems caused by the limitations and disadvantages of the related art.

Accordingly, it is a general object in one embodiment of the present invention to provide a technology to provide information associated with costs and environmental burdens with respect to data subject to outputting that substantially obviate one or more problems caused by the limitations and disadvantages of the related art.

In one aspect of the embodiment, there is provided an information processing apparatus that includes a receiver configured to receive an output instruction to output data; a calculator configured to calculate an index value indicating a cost or an environmental burden when data subjected to output are output in a first output condition specified by the output instruction, and the index value when the data are output in a second output condition differing from the first output condition; and a display controller configured to display a screen to display a calculation result obtained by the calculator, and to receive an output instruction based on one of the first and the second output conditions.

Other objects, features and advantages of the present invention will become more apparent from the following detailed description when read in conjunction with the accompanying drawings.

BRIEF DESCRIPTION OF THE DRAWINGS

FIG. 5 is a diagram illustrating a configuration example of a condition storage part;

FIG. 8 is a diagram illustrating a configuration example of a print cost table;

FIG. 9 is a diagram illustrating a configuration example of a sheet cost table;

FIG. 10 is a diagram illustrating a configuration example of a conversion rate table;

FIG. 14 is a diagram illustrating a configuration example of a display cost table.

DETAILED DESCRIPTION OF THE PREFERRED EMBODIMENTS

Figure 1:
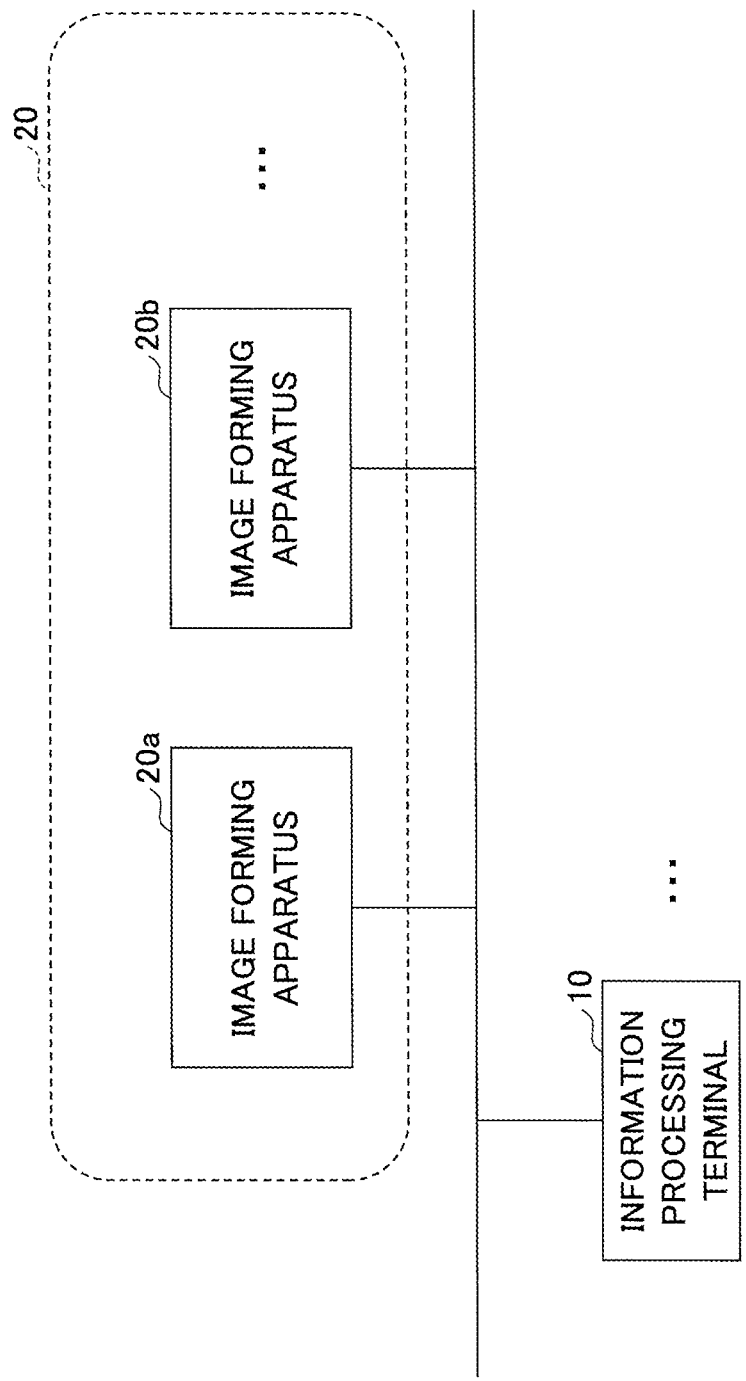
FIG. 1 is a diagram illustrating a configuration example of a system in a first embodiment.

In the following, a description is given of embodiments with reference to accompanying drawings. FIG. 1 is a diagram illustrating a configuration example of a system in a first embodiment. In FIG. 1, two or more image forming apparatuses 20 such as image forming apparatuses 20a and 20b, and the like, and at least one information processing terminal 10 are connected via a network (regardless of wired or wireless) such as a local area network or the Internet such that the image forming apparatuses 20 and the information processing terminal 10 are in communication with one another.

The image forming apparatus 20 is a multifunctional peripheral that incorporates the functionality of multiple devices such as a printer, a scanner, a copier, and a facsimile machine in one. However, an apparatus having the functionality of one of the above devices may serve as the image forming apparatus 20. The image forming apparatus 20 in the first embodiment may be a printer only having a printing function.

The information processing terminal 10 serves as a computer configured to transmit a print request to the image forming apparatus 20. Examples of the information processing terminal 10 include a personal computer (PC), a mobile phone, a smartphone, a tablet terminal, a personal digital assistance (PDA), and the like.

Figure 2:
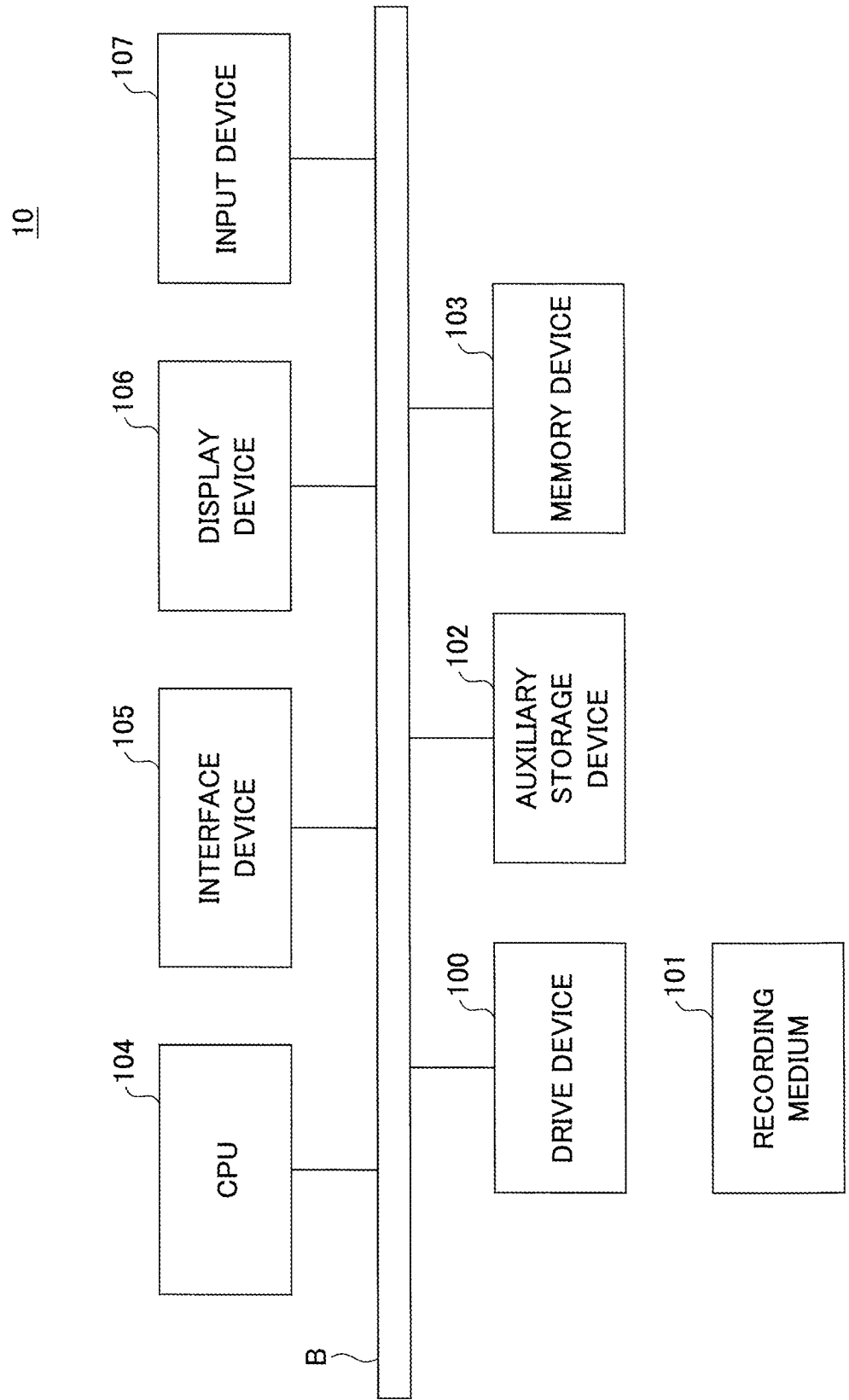
FIG. 2 is a diagram illustrating a hardware configuration example of an information processing terminal in the first embodiment.

FIG. 2 is a diagram illustrating a hardware configuration example of an information processing terminal in the first embodiment. The information processing terminal 10 of FIG. 2 includes a drive device 100, an auxiliary storage device 102, a memory device 103, a CPU 104, an interface device 105, a display device 106, and an input device 107 that are connected to one another via a bus B.

Programs implementing processes in the information processing terminal 10 are provided in a form of a recording medium 101 such as a CD-ROM. When the recording medium 101 storing the programs is set in the drive device 100, the programs are installed from the recording medium 101 into the auxiliary storage device 102 via the drive device 100. Note that the programs are not necessarily installed from the recording medium 101, and may be downloaded from another computer via a network. The auxiliary storage device 102 is configured to store installed programs as well as storing necessary files, data, and the like.

The memory device 103 is configured to retrieve the programs from the auxiliary storage device 102 and store the retrieved programs when receiving instructions to activate the programs. The CPU 104 is configured to implement functions associated with the information processing terminal 10 in accordance with the programs stored in the memory device 103. The interface device 105 is configured to serve as an interface for connecting the information processing terminal 10 to a network. The display device 106 is configured to display a graphical user interface (GUI) based on programming. The input device 107 is composed of a keyboard, a mouse, and the like, and is used by a user to input various operating instructions.

Figure 3:
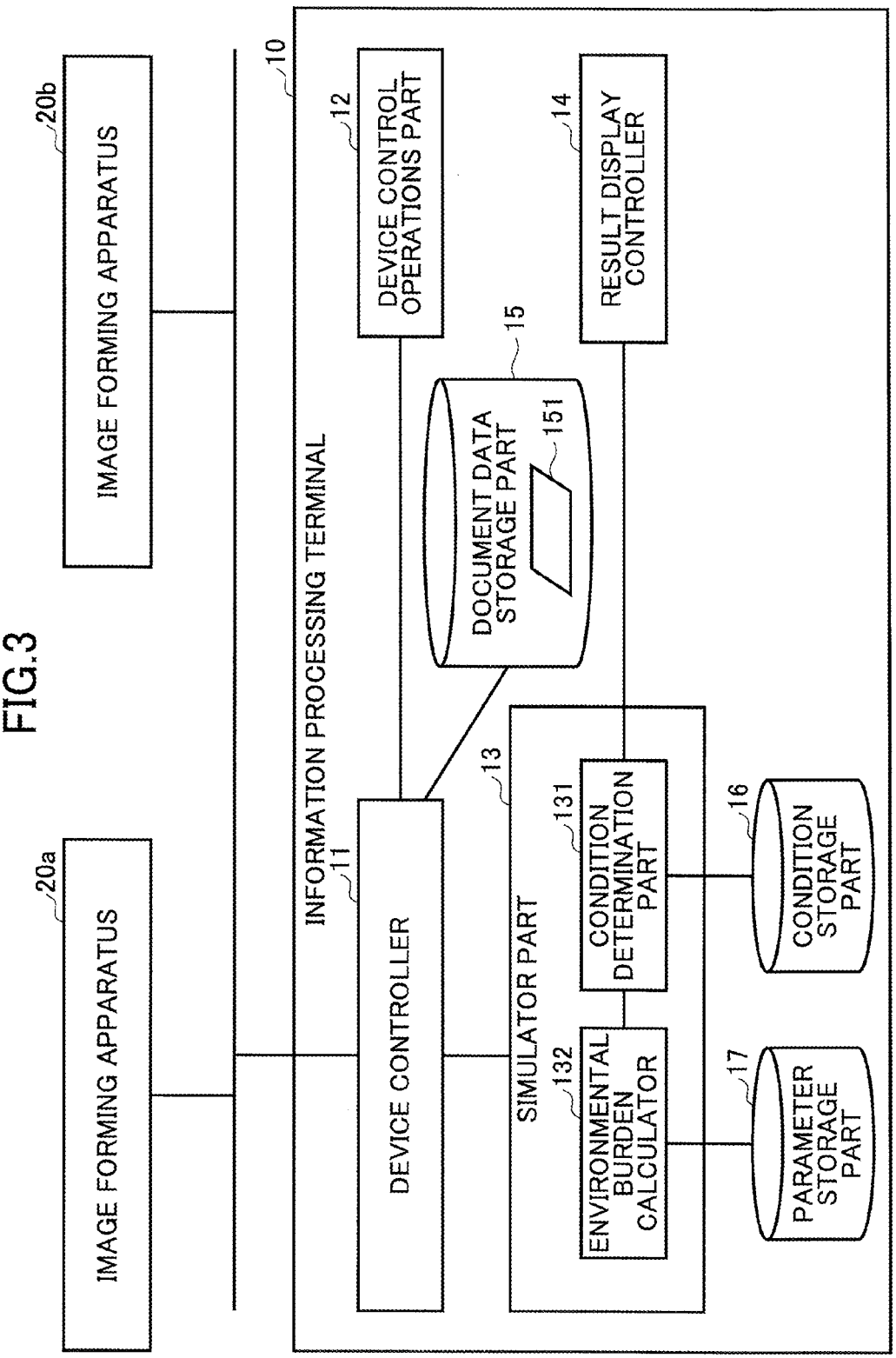
FIG. 3 is a diagram illustrating a functional configuration example of the information processing terminal in the first embodiment.

FIG. 3 is a diagram illustrating a functional configuration example of the information processing terminal 10 in the first embodiment. In FIG. 3, the information processing terminal 10 includes a device controller 11, a device control operations part 12, a simulator part 13, and a result display controller 14. The above components may be implemented by programs installed in the information processing terminal 10 that causes the CPU 104 to execute processes. The information processing terminal 10 further includes a document data storage part 15, a condition storage part 16, and a parameter storage part 17. The above components may be implemented by using the auxiliary storage device 102. Note that alternatively, another apparatus that may be in communication with the information processing terminal 10 may include the document data storage part 15, the condition storage part 16, and the parameter storage part 17.

The device controller 11 is configured to generate print data of document data 151 selected as a print target (output target), and transmit the print data to the image forming apparatus 20. The device control operations part 12 is configured to display a print setting screen for receiving from a user a print instruction (an output instruction) of the document data 151 addressed to the device controller 11. Further, print settings such as a print condition (print attribution) may also be performed via the print setting screen. Note that the device controller 11 and the device control operations part 12 may be implemented by a printer driver that causes the CPU 104 to execute processes.

The simulator part 13 is configured to execute simulation for estimating cost of printing generated based on a print instruction, and estimating burden on the environment. The simulator part 13 is configured to execute simulation for estimating cost of printing based on a print condition differing from that in the print instruction, printing via the image forming apparatus 20 differing from that in the print instruction, and outputting in a form differing from printing; and estimating burden on the environment. The environmental burden may be estimated by the calculation of an index value of burden on the environment (hereinafter referred to as an "environmental burden value"). In the first embodiment, examples of the environmental burden value include electric power consumption (Wh), and $CO_2$ emissions (kg). In addition, the first embodiment may also illustrate the cost (yen) as an example of the environmental burden value for convenience of illustration. Further, other index values may be used as the environmental burden value.

In FIG. 3, the simulator part 13 includes a condition determination part 131 and an environmental burden calculator 132. The condition determination part 131 is configured to determine a simulation condition. The simulation condition indicates information defining a condition for calculating the environmental burden value. For example, the simulation condition includes a print condition, an output condition in place of the print condition, and the like. In the first embodiment, the simulation condition is stored in the condition storage part 16 for each of users. That is, the simulation condition may differ for each of the users. Further, two or more simulation conditions may be stored for one user. Note that the simulation condition may be common to all the users.

The environmental burden calculator 132 is configured to calculate an environmental burden value based on the simulation condition determined by the condition determination part 131. The environmental burden value may be calculated based on parameters, coefficients, or the like stored in the parameter storage part 17.

Figure 4:
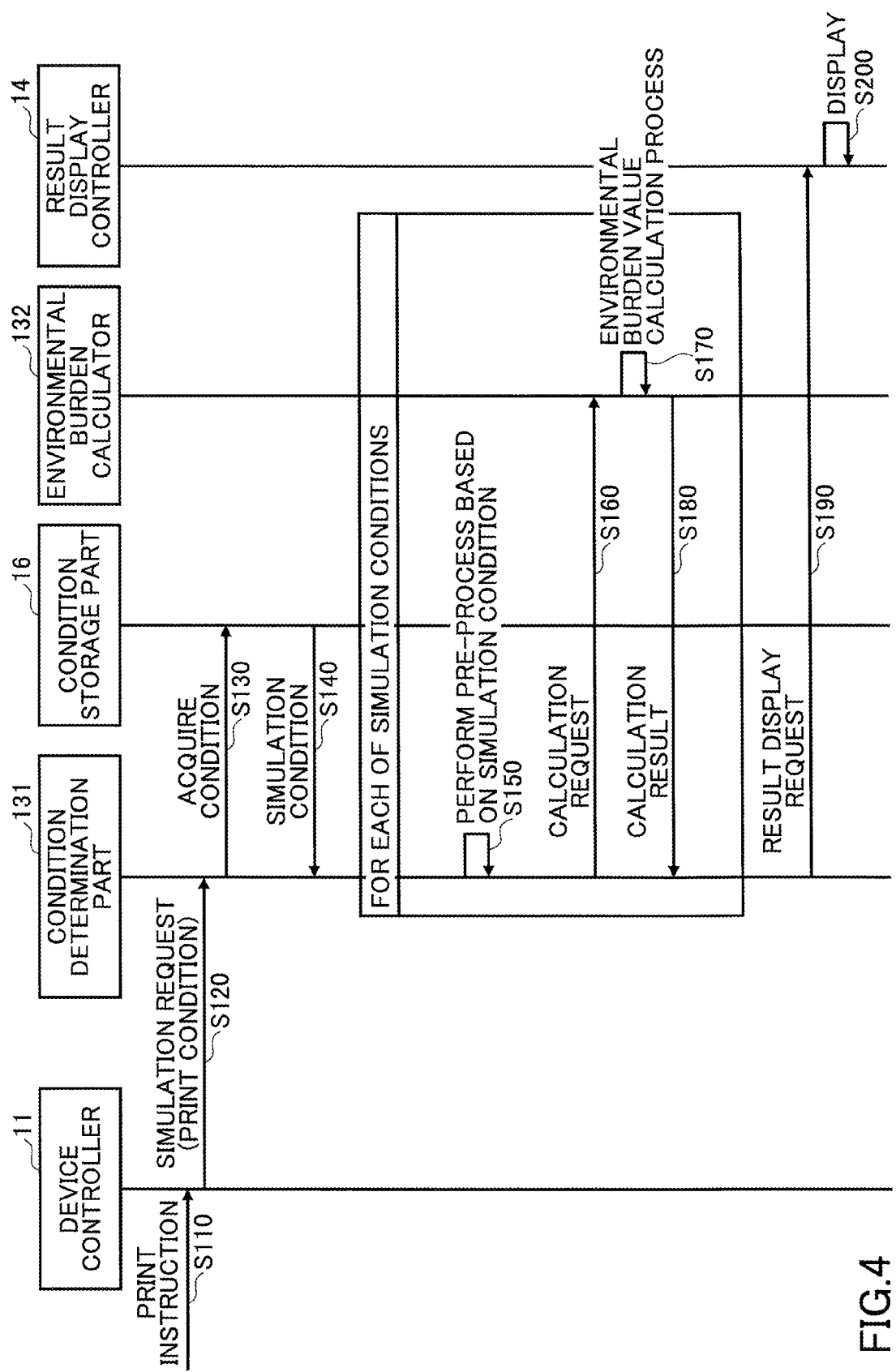
FIG. 4 is a sequence diagram illustrating an example of a process executed by the information processing terminal.

In the following, a description is given of a process executed by the information processing terminal 10. FIG. 4 is a sequence diagram illustrating an example of a process executed by the information processing terminal 10. In the initial status of FIG. 4, the device control operations part 12 displays a print setting screen on the display device 106 of the information processing terminal 10. It is assumed that the print condition is already set via the print setting screen.

In step S110, a print execution instruction may be input via the print setting screen by, for example, a user's pressing an "OK" button (step S110). The device controller 11 inputs to the condition determination part 131 a simulation execution request including the print condition set in the print setting screen and document data 151 subjected to printing, in response to the print execution instruction (step S120). Note that the simulation execution request may include information indicating a location of the document data 151 such as a file name of the document data 151 instead of an entity of the document data 151. In the first embodiment, the document data 151 may be those used for presentation such as conference materials for convenience of illustration.

Subsequently, the condition determination part 131 acquires a simulation condition corresponding to a login user (steps S130 and S140).

FIG. 5 is a diagram illustrating a configuration example of the condition storage part 16. As illustrated in FIG. 5, the condition storage part 16 is configured to store one or more simulation conditions in association with each of user names. For example, each of the user "Yamada" and the user "Suzuki" is associated with a different set of three simulation conditions.

In the simulation conditions, "default" indicates calculation of an environmental burden value relating to printing based on a print condition specified by the user. "Aggregation (XXX)" indicates an example of the simulation condition to change the print condition. That is, "aggregation (XXX)" indicates calculation of the environmental burden value relating to printing when an "aggregation" condition is added to the print condition specified by the user. Note that "(XXX)" indicates a detailed setting condition of the aggregation. For example, "(double sided 2 in 1)" indicates that two pages are printed on each of the sides. Note that the "double sided" part of the above may be a "single sided", and the aggregation number may be different such as "4 in 1" instead of "2 in 1". Further, the "double sided" may only be specified without the "aggregation" being specified. Note that "monochrome", "sheet size", and the like may be set as a simulation condition for changing the print condition. The "monochrome" indicates printing data in black and white (monochrome printing). The "sheet size" indicates printing data in a specific sheet size specified in the "sheet size" such as "A4" size.

The "another apparatus within network" indicates calculation of the environmental burden value of each of the image forming apparatuses 20 based on the simulation conditions set for a user, excluding the image forming apparatus 20 specified as the print destination (output destination) in the print condition among the image forming apparatuses 20 connected via the network to the information processing terminal 10. For example, according to the simulation conditions set for the user Yamada, the environmental burden value is calculated for each of the "default" and the "aggregation (double sided 2 in 1)" with respect to each of the image forming apparatuses 20.

The "display (YYY)" set for the user Suzuki indicates calculation of the environmental value when the document data 151 subjected to printing are displayed without being displayed. That is, the "display" is an example of an output form differing from printing. The "(YYY)" part indicates a model name of an apparatus serving as a display destination. The "projector A" indicates a specific model of the projector. The "tablet B" indicates a specific model of the tablet terminal.

For example, when the login user is the user Yamada, three simulation conditions are acquired. The user name of the login user may be acquired via the Application Program Interface (API) provided by an operating system (OS) of the information processing terminal 10.

Subsequently, steps S150 to S180 are executed based on each of the acquired simulation conditions. In step S150, the condition determination part 131 executes a pre-process necessary for calculating the environmental burden value. The content of the pre-process may vary with the simulation conditions. Further, the pre-process may be omitted for some of the simulation conditions.

Subsequently, the condition determination part 131 requests the environmental burden calculator 132 to calculate an environmental value (step S160). In response to the request, the print conditions, the simulation conditions, the document data 151, and the like are reported to the environmental burden calculator 132. Further, when the pre-process is executed, an executed result of the pre-process may also be reported to the environmental burden calculator 132.

Subsequently, the environmental burden calculator 132 calculates an environmental burden value based on reported information and parameters stored in the parameter storage part 17 (step S170). A detailed calculation process of the environmental burden value will be illustrated later. Subsequently, the environmental burden value calculator 132 outputs the calculated environmental burden value to the condition determination part 131 (step S180).

When the environmental burden value is calculated for each of the simulation conditions, the condition determination part 131 requests the result display controller 14 to display a calculated result of the environmental burden value (step S190). The result display controller 14 displays an environmental burden reporting screen including the environmental burden value on the display device 106.

Figure 6:
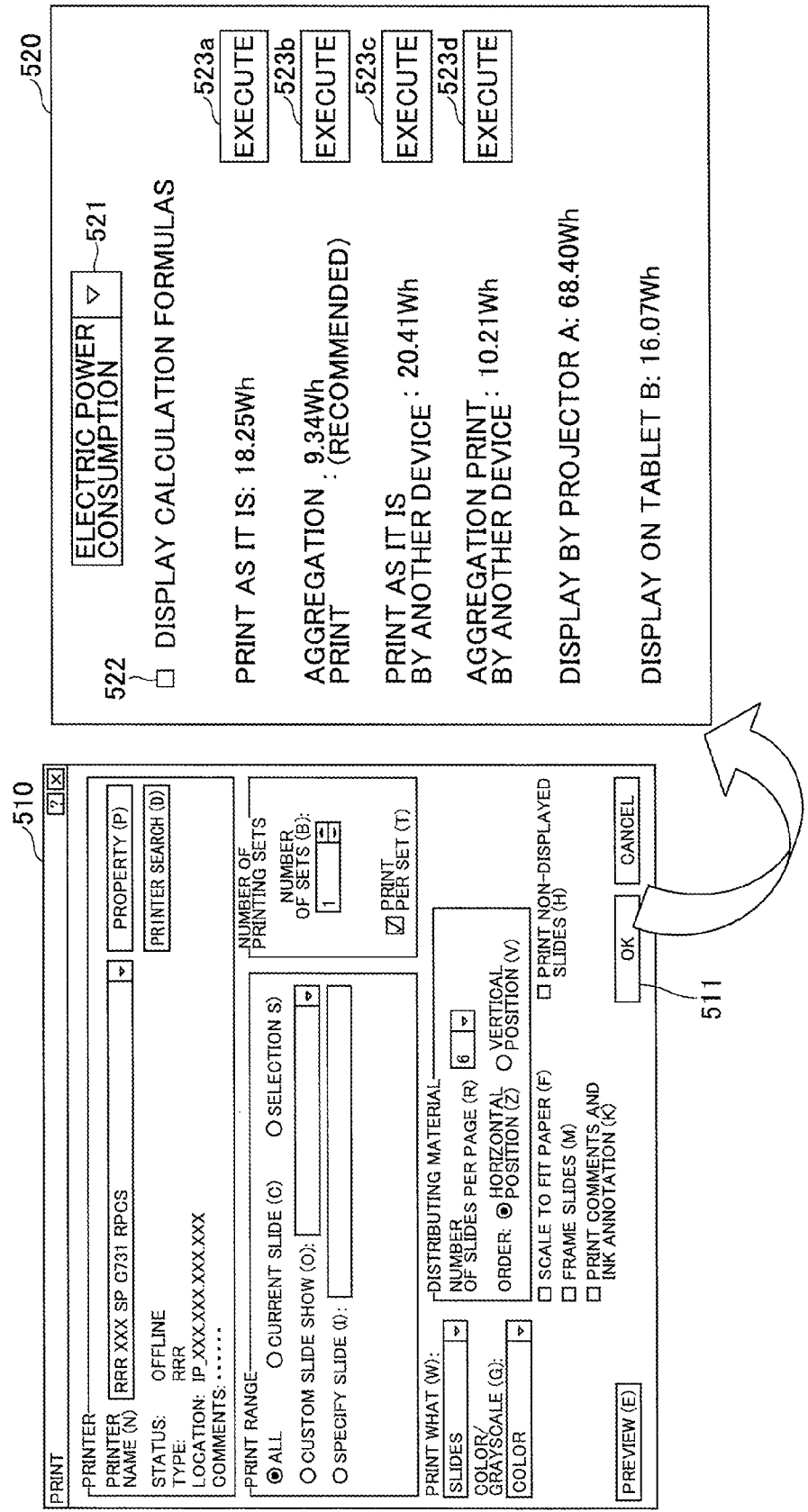
FIG. 6 is a diagram illustrating a display example of an environmental burden reporting screen.

FIG. 6 is a diagram illustrating a display example of the environmental burden reporting screen. FIG. 6 illustrates a process in which an environmental burden reporting screen 520 is displayed by pressing an "OK" button 511 of the print setting screen 510.

In FIG. 6, the environmental burden reporting screen 520 includes a combo box 521, a check button 522, respective calculation results of the environmental burden values for the simulation conditions, and execution buttons 523a to 523d.

The combo box 521 is used for allowing the user to select a scale or a type of the environmental burden value. In the first embodiment, selection of the combo box 521 includes cost, electric power consumption, and $CO_2$ emissions. For example, when the $CO_2$ emissions are selected, the calculated result of the environmental burden value is displayed based on the $CO_2$ emissions.

The check button 522 is used for allowing the user to select whether to display calculation formulas for calculating the environmental burden value. When the check button 522 is checked, the calculation formula is displayed for each of the calculation results of the environmental burden values. Details of the calculation formulas will be described later.

The calculation result of the environmental burden value for each of the simulation conditions is obtained by the environmental burden calculator 132. FIG. 6 illustrates a calculation result obtained based on a combination of the simulation conditions for the user Yamada and the user Suzuki for convenience of illustration.

The execution buttons 523a to 523d are disposed corresponding to the simulation conditions for printing as the output form. When any one of the execution buttons 523 is pressed, printing is executed based on the print condition used in the simulation condition corresponding to the pressed execution button 523.

Specifically, when any one of the execution buttons 523 is pressed, the simulation conditions corresponding to the pressed execution button 523 is reported from the result display controller 14 to the device controller 11. The device controller 11 reflects the simulation conditions to the print condition set to the print setting screen 510. For example, the simulation conditions may be added to the print condition or the print condition may be overwritten with the simulation conditions. The device controller 11 generates print data corresponding to the document data 151 subjected to printing based on the print condition reflecting the simulation conditions, and transmits the print data to the image forming apparatus 20 serving as a print destination.

Note that the execution buttons may be disposed corresponding to simulation conditions associated with the display (e.g., "displayed by the projector A", or "displayed on the tablet B"). When the execution button is pressed, the document data 151 subjected to printing are transmitted to an IP address set in advance, and printing may be terminated. The IP address set in advance may be an IP address of the projector A or an IP address of one of the tablets B. The expression of "one of the tablets B" is employed because tablet terminals are generally used by individuals. Hence, when the number of sets to be printed is plural in number, the document data may be transmitted to plural tablet terminals.

Figure 7:
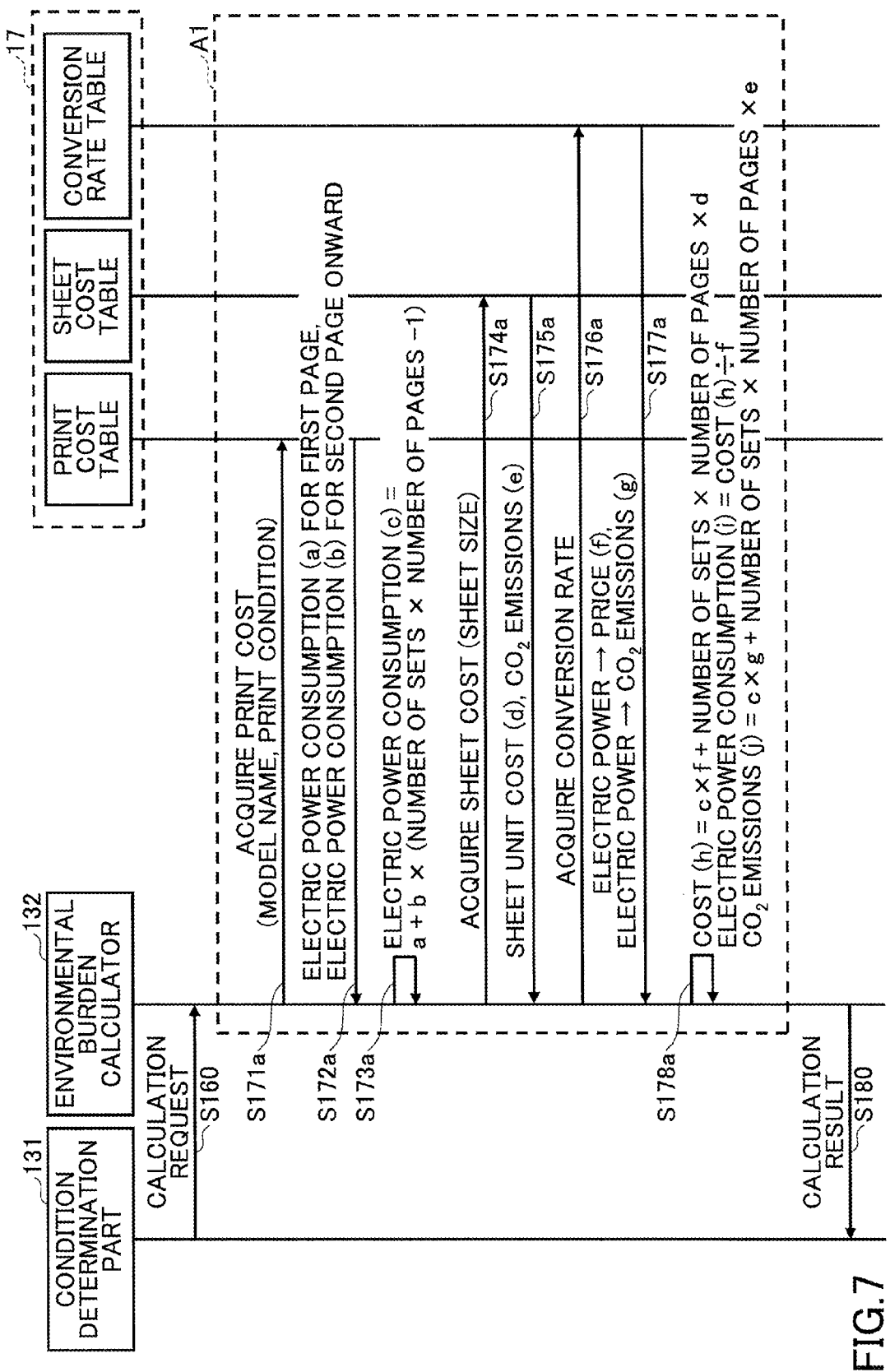
FIG. 7 is a sequence diagram illustrating an example of a calculation process of an environmental burden value in a case where a simulation condition is a default.

Subsequently, details of step S170 are illustrated. FIG. 7 is a sequence diagram illustrating an example of a calculation process of an environmental burden value in a case where a simulation condition is a default. With this simulation condition, a process including steps S171a to S178a of step S170 is executed without the execution of the pre-process. Note that the process including steps S171a to S178a of step S170 is hereinafter referred to as a "process A1".

In steps S171a and S172a, the environmental burden calculator 132 acquires electric power consumption (hereinafter called a "print cost") required for a print process performed in accordance with a print condition (hereinafter called an "initial print condition") set by the user via the print setting screen from the print cost table stored in the parameter storage part 17.

FIG. 8 is a diagram illustrating a configuration example of a print cost table. In FIG. 8, the print cost table is configured to store electric power consumption for the first sheet and the electric power consumption for the second sheet onward in association with a combination of a model name, a sheet size, color/monochrome, and single-sided/double-sided items.

The model name of the print cost table is compared to the model name of the image forming apparatus 20 specified in the initial print condition. The sheet size of the print cost table is compared to the sheet size specified in the initial print condition. The color/monochrome of the print cost table is compared to the color specification (color or monochrome) in the initial print condition. The single-sided/double-sided of the print cost table is compared to the printing side specification in the initial print condition.

In steps S171a and S172a, the environmental burden calculator 132 acquires as the print cost the electric power consumption for the first sheet and the electric power consumption for the second sheet onward of the record having values of the items that match those of the initial print condition. The electric power consumption for the first sheet and the electric power consumption for the second sheet onward are managed as separate items because the electric power consumption for the first sheet needs to consider the overhead in the first print process.

Subsequently, the environmental burden calculator 132 calculates the electric power consumption (c) required for the print process under the initial print condition based on the following formula (1) (step S173a). Note that (c) of the electric power consumption (c) is simply used as an identifier to identify the electric power consumption computed in step S173a. The alphabet in brackets attached to an end of each parameter is also used as an identifier of the same kind.

$$\text{Electric power consumption }(c)=\text{electric power consumption for the first sheet}+\text{electric power consumption for the second sheet onward}\times(\text{the number of sets}\times(\text{the number of pages}-1)) \quad (1)$$

The number of sets indicates the number of printing sets specified in the initial print condition. The number of pages indicates the number of pages of the document data 151 subjected to printing. The reason for subtracting 1 from the number of pages is to exclude the first page from the count.

Subsequently, the environmental burden calculator 132 acquires the sheet cost corresponding to the sheet size specified in the initial print condition from the sheet cost table stored in the parameter storage part 17 (steps S174a and S175a). The sheet cost indicates the cost required for buying the sheets themselves. That is, the cost required for the print process does not include the cost of the sheets, as the sheets are acquired separately.

FIG. 9 is a diagram illustrating a configuration example of a sheet cost table. In FIG. 9, the sheet cost table is configured to store the sheet unit cost and $CO_2$ emissions in association with the sheet type.

The sheet type is a concept of a combination of the sheet size and surface properties of the sheet. The sheet unit cost indicates the cost per sheet. The $CO_2$ emissions indicate the amount of $CO_2$ emitted per sheet in the fabrication process. In step S175a, the environmental burden calculator 132 acquires the sheet unit cost (d) and the $CO_2$ emissions (e) of the record corresponding to the sheet type specified in the initial print condition.

Subsequently, the environmental burden calculator 132 acquires the conversion rate (f) of the electric power [Wh] to the price [Yen], and the conversion rate (g) of the electric power [Wh] to the $CO_2$ emissions [kg] from the conversion rate table stored in the parameter storage part 17 (steps S176a and S177a).

FIG. 10 is a diagram illustrating a configuration example of a conversion rate table. As illustrated in FIG. 10, the conversion rate table is configured to store a conversion rate for each of the conversion contents. In step S177a, the environmental burden calculator 132 acquires two records illustrated in FIG. 10.

Subsequently, the environmental burden calculator 132 calculates the cost (h) as the environmental burden value, the electric power consumption (i), and the $CO_2$ emissions (j) (step S178a). The cost (h), the electric power consumption (i), and the $CO_2$ emissions (j) may be calculated using the following formulas (2) to (4).

$$\text{Cost }(h)=\text{electric power consumption }(c)\times\text{conversion rate }(f)+\text{the number of sets}\times\text{the number of pages}\times\text{the sheet unit cost }(d) \quad (2)$$

$$\text{Electric power consumption }(i)=\text{cost }(h)/\text{conversion rate }(f) \quad (3)$$

$$CO_2 \text{ emissions }(j)=\text{electric power consumption }(c)\times\text{conversion rate }(g)+\text{the number of sets}\times\text{the number of pages}\times CO_2\text{ emissions }(e) \quad (4)$$

In step S180, the cost (h), the electric power consumption (i), and the $CO_2$ emissions (j) are output as calculation results.

Figure 11:
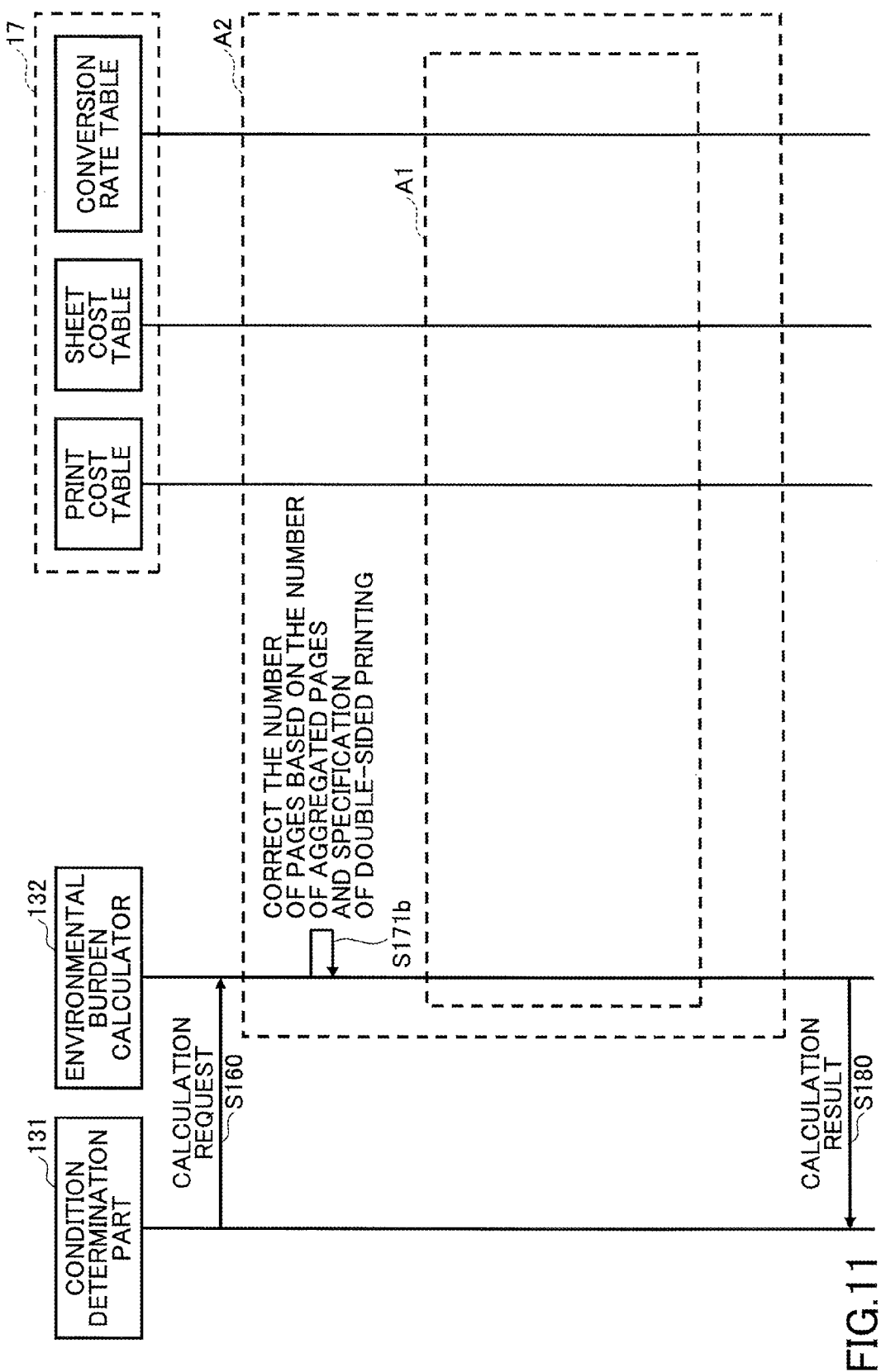
FIG. 11 is a sequence diagram illustrating an example of a calculation process of an environmental burden value in a case where a simulation condition includes aggregation or double sided printing.

Subsequently, a calculation process of the environmental burden value is performed when the simulation conditions include the aggregation or double-sided printing. FIG. 11 is a sequence diagram illustrating an example of a calculation process of an environmental burden value in a case where the simulation conditions include aggregation or double-sided printing.

With this simulation condition, step S171b and the process A1 (see FIG. 7) of step S170 are executed without the execution of the pre-process. Note that a process including step S171b and the process A1 of step S170 is hereinafter referred to as a "process A2" (see FIG. 11).

In step S171b, the environmental burden calculator 132 corrects the number of pages of the document data 151 subjected to printing based on the aggregation number of pages and the specification of the double-sided printing in the simulation conditions. Specifically, when the aggregation is specified in the simulation conditions, the number of pages of the document data 151 is divided by the aggregation number of pages. Further, when the double-sided printing is specified in the simulation conditions, the number of pages of the document data 151 is divided by two. When the double-sided printing is specified in the simulation condition, the number of pages of the document data 151 is divided by two. In the subsequently executed process A1, calculation is performed by using the corrected number of pages.

Figure 12:
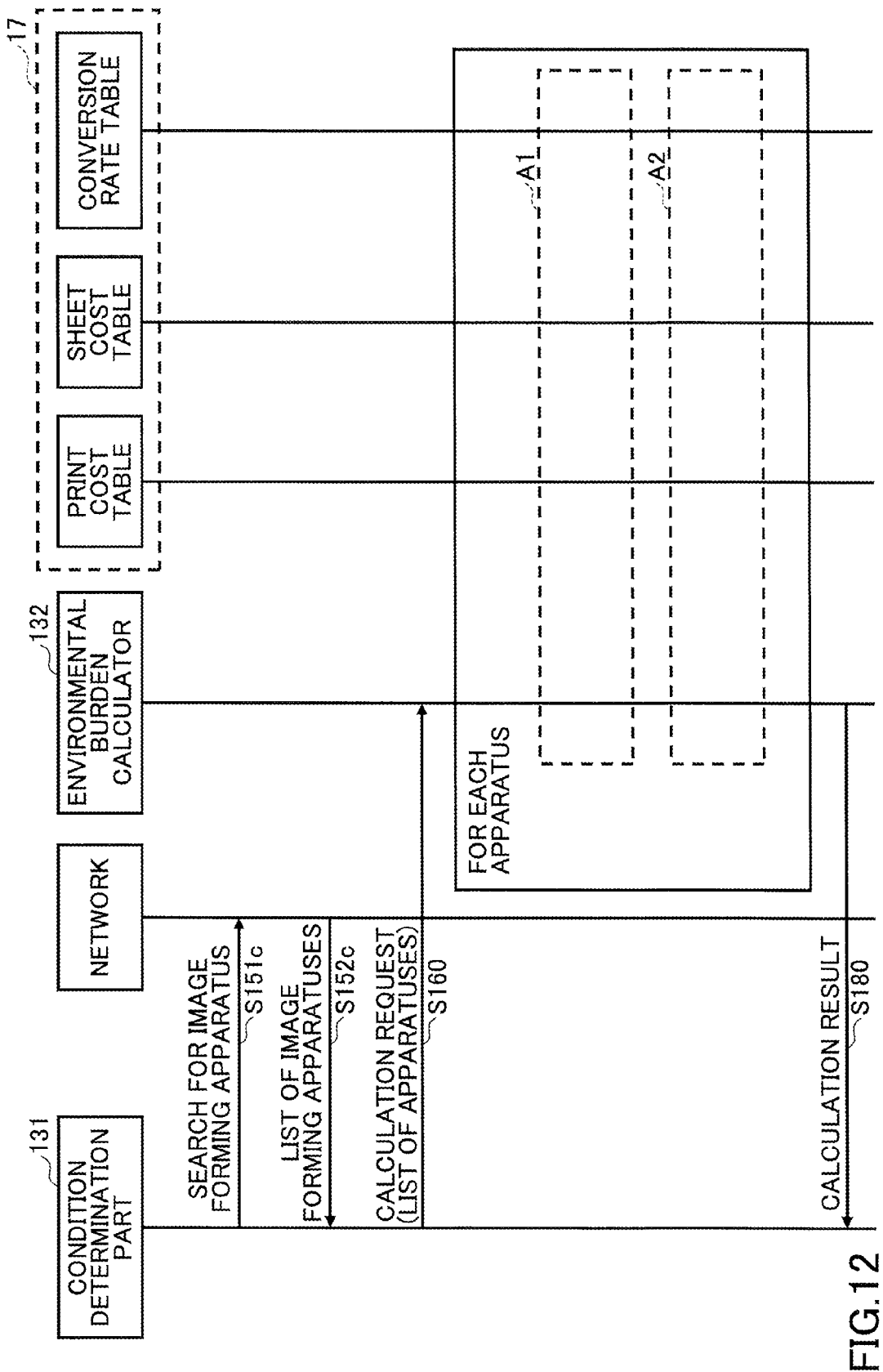
FIG. 12 is a sequence diagram illustrating an example of a calculation process of an environmental burden value in a case where a simulation condition is another apparatus within a network.

Subsequently, an illustration is given of a calculation process of the environmental burden value in a case where the simulation condition is another apparatus within a network. FIG. 12 is a sequence diagram illustrating an example of a calculation process of the environmental burden value in a case where a simulation condition is another device within a network.

In this simulation condition, steps S151c and S152c are conducted in the pre-process (step S150). Specifically, the condition determination part 131 searches for a list of the image forming apparatuses 20 connected to a network that is connected to the information processing terminal 10 (steps S151c, and S152c). The searching of the image forming apparatuses 20 may be carried out by using a known apparatus searching method. Further, along with the searching, attribute information including a model name and information necessary for transmitting print data (e.g., an IP address) is acquired from each of the image forming apparatuses 20. The model name is acquired because the model name is required for acquiring the print cost from the print cost table. The information necessary for transmitting the print data is acquired because such information is necessary for transmitting the print data to one of the image forming apparatuses 20 when the execution button 523 in association with the corresponding image forming apparatus 20 is pressed in the environment burden reporting screen 520 (FIG. 6).

Subsequently, the condition determination part 131 requests the environmental burden calculator 132 to calculate the environmental burden value by specifying a list of attribute information of the image forming apparatuses 20 excluding the image forming apparatus 20 specified as a print destination in the initial print condition (step S160).

The environmental burden calculator 132 executes the process A1 and the process A2 for each of the image forming apparatuses 20 included in the list in step S170. Note that the process A2 will not be executed when the simulation condition including the aggregation or the double-sided printing is not set corresponding to the login user.

Figure 13:
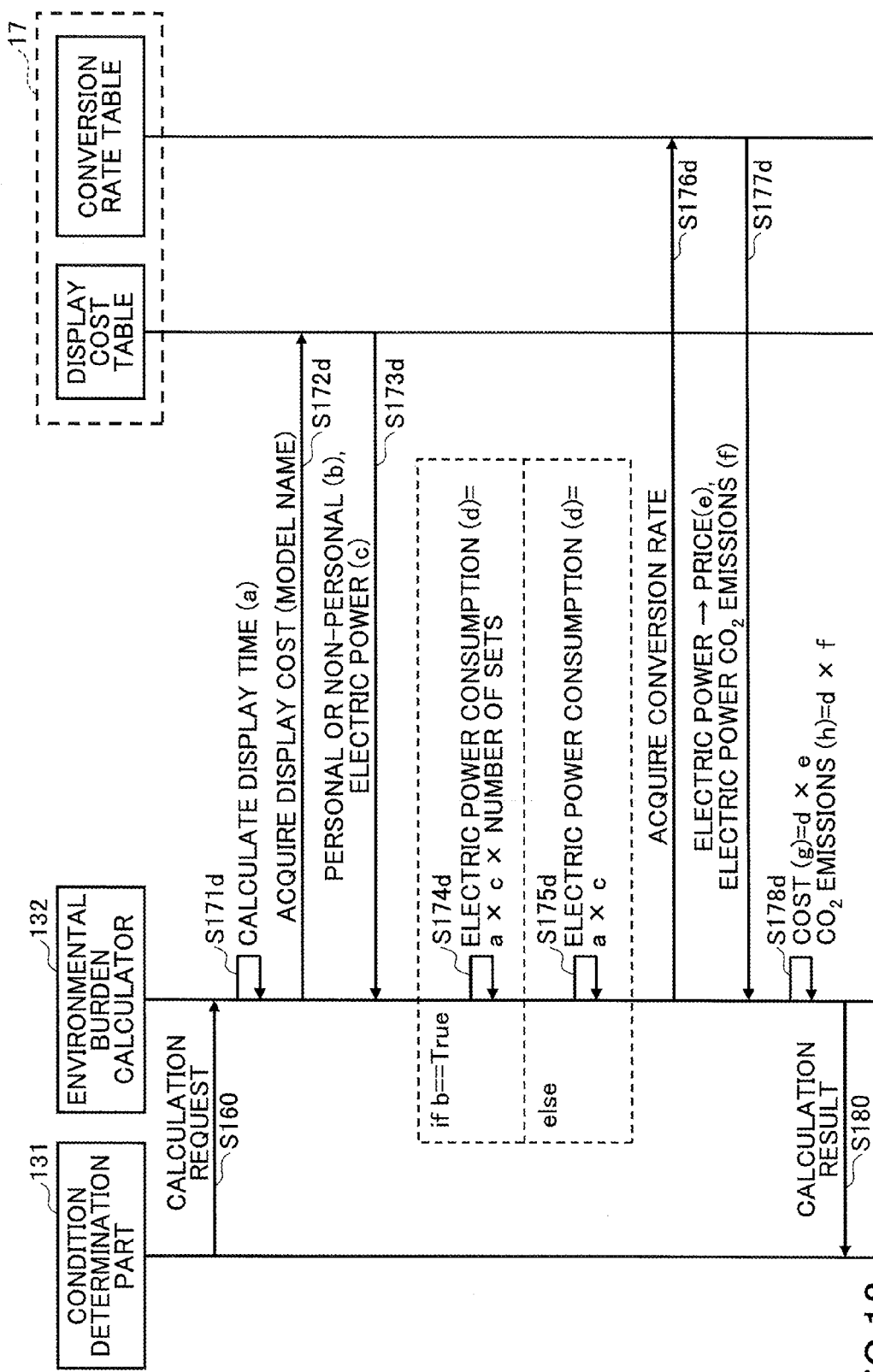
FIG. 13 is a sequence diagram illustrating an example of a calculation process of an environmental burden value in a case where a simulation condition is a display.

Subsequently, an illustration is given of a calculation process of the environmental burden value in a case where the simulation condition is a display. FIG. 13 is a sequence diagram illustrating an example of a calculation process of the environmental burden value in a case where a simulation condition is a display.

With this simulation condition, steps S171d to S178d of step S170 are executed without the execution of the pre-process.

In step S171d, the environmental burden calculator 132 calculates an estimated value of a display time (hereinafter simply referred to as a "display time (a)") when the document data 151 subjected to printing is displayed. A first example of the calculation method of the display time (a) is obtained by multiplying the number of pages by a predetermined time. A second example of the calculation method of the display time (a) is obtained by calculating a display time for each of pages based on the content of a corresponding one of the pages, and summing the calculated display times. The content of the page includes the number of characters, the number of graphics, and the like. The number of characters may be multiplied by a predetermined time, or the number of graphics may be multiplied by another predetermined time. A third example of the calculation method of the display time (a) is obtained by extracting a predetermine display time pre-embedded in the document data 151 from the document data 151. When the predetermined display time is embedded in each of the pages, a total display time may be calculated by summing the predetermined display times of the respective pages. The predetermined display time may be embedded in the document data 151 by a method appropriate to the data format of the document data 151.

Subsequently, the environmental burden calculator 132 acquires from the display cost table stored in the parameter storage part 14 display cost information corresponding to the model name of the display destination apparatus specified in the simulation condition (steps S172d, and S173d).

FIG. 14 is a diagram illustrating a configuration example of a display cost table. In FIG. 14, the display cost table is configured to store a personal flag and electric power consumption in association with a model name. The personal flag indicates information of whether the display result in association with the model type of the apparatus is simultaneously referred to by one person or two or more people in a normal usage. "False" indicates the information is simultaneously referred to by two or more people in the normal usage. "True" indicates the information is simultaneously referred to by one person in the normal usage. For example, an image projected by a projector may generally be referred to by two or more people. On the other hand, an image displayed on a tablet terminal may generally be referred to by one person.

The electric power consumption indicates electric power consumption due to the display in the apparatus associated with the model name.

In step S173d, a personal flag (b) and electric power consumption (c) of the record corresponding to the model name specified as the display destination are included in the simulation conditions.

Subsequently, a process is branched based on whether the personal flag (b) is "True". When the personal flag (b) is "True", the environmental burden calculator 132 calculates the electric power consumption (d) based on the following formula (5) (step S174d).

$$\text{Electric power consumption }(d) = \text{display time }(a) \times \text{electric power consumption }(c) \times \text{the number of sets} \quad (5)$$

In this formula, the reason that the number of sets is a multiplier is because it is estimated that a display result is displayed for a display time by the number of apparatuses corresponding to the number of sets.

When the personal flag (b) is "False", the environmental burden calculator 132 calculates the electric power consumption (d) based on the following formula (6) (step S175d).

$$\text{Electric power consumption } (d) = \text{display time } (a) \times \text{electric power consumption } (c) \quad (6)$$

Note that the electric power consumption (d) calculated in step S174d or S175d constitutes a calculation result of the environmental burden value.

Subsequently, the environmental burden calculator 132 acquires the conversion rate (e) of the electric power [Wh] to the price [Yen], and the conversion rate (f) of the electric power [Wh] to the $CO_2$ emissions [kg] from the conversion rate table (FIG. 10) (steps S176d and S177d).

Subsequently, the environmental burden calculator 132 calculates the environmental burden value with respect to uncalculated two of the three scales (step S178d). The cost (g) and the $CO_2$ emissions (h) serving as the environmental burden values are calculated by the following formulas (7) and (8).

$$\text{Cost } (g) = \text{electric power consumption } (d) \times \text{conversion rate } (e) \quad (7)$$

$$CO_2 \text{ emissions } (h) = \text{electric power consumption } (d) \times \text{conversion rate } (f) \quad (8)$$

In step S180, the electric power consumption (d), the cost (g), and the $CO_2$ emissions (h) are output as calculation results.

As described above, in the first embodiment, the environmental burden values are calculated for the data subjected to printing, and the calculated results are presented to a user when the print process is executed, when the print process is executed based on the print condition differing from the print condition specified by the user, and when the output (display) process that is an output form differing from that specified by the user in the print condition is executed. Hence, the user may be able to select an output process (output form) in consideration of the environmental burden value when printing.

Note that in the first embodiment, the environmental burden values are displayed when the user instructs printing. However, the environmental burden values may be displayed when the user instructs displaying. In this case, the environmental burden values in association with display may be calculated based on the display condition (e.g., brightness or a screen size). Further, when the simulation condition indicating an output of data in another output form by the model type of the apparatus is set, the environmental burden value is calculated with respect to printing or the like performed in such a model type of the apparatus.

Next, a second embodiment is described. In the following, the configuration of the second embodiment differing from the first embodiment is described. Hence, configuration elements not specifically mentioned in the second embodiment are the same as the first embodiment.

Figure 15:
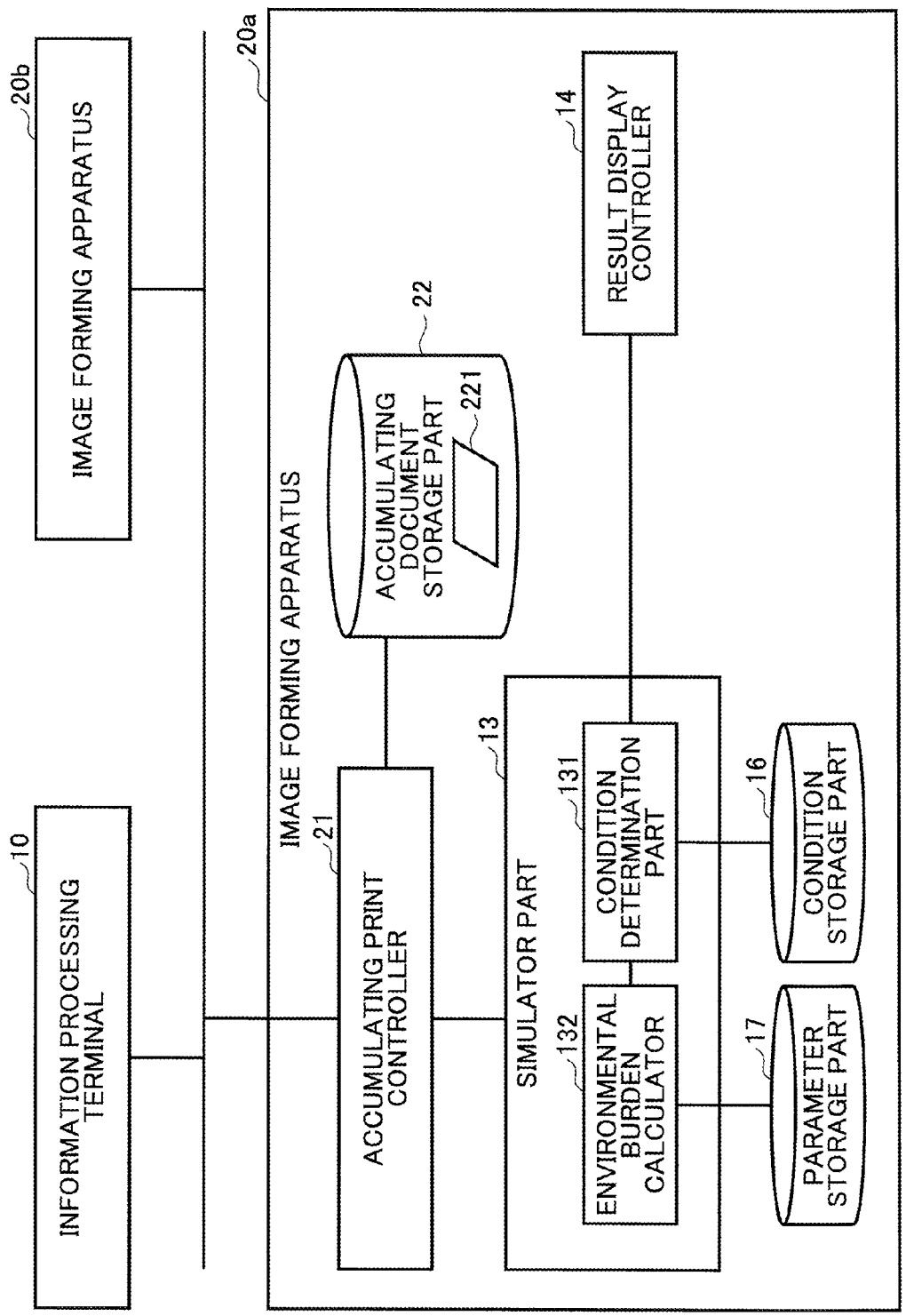
FIG. 15 is a diagram illustrating a functional configuration example of an image forming apparatus in a second embodiment.

FIG. 15 is a diagram illustrating a functional configuration example of an image forming apparatus in a second embodiment. In FIG. 15, parts implementing the same functions as those illustrated in FIG. 3 are provided with the same reference numbers, and duplicated illustrations are omitted from the specification.

In FIG. 15, the image forming apparatus 20 includes a simulator part 13, a result display controller 14, a parameter storage part 17, and a condition storage part 16. The image forming apparatus 20 further includes an accumulating print controller 21, and an accumulating document storage part 22.

The accumulating document storage part 22 is configured to store document data 221 corresponding to a user name in association with an accumulating print request received from the information processing terminal 10. The accumulating print request indicates not immediately printing the document data 221 on receiving the document data 221, but accumulating the document data 221 in the image forming apparatus 20 and printing in response to a user's operation via an operation panel of the image forming apparatus 20.

The accumulating print controller 21 displays on the operation panel, among the document data 221 stored in the accumulating document storage part 22, a list of document data 221 in association with a user name of a login user of the image forming apparatus 20. The accumulating print controller 21 causes the image forming apparatus 20 to print the document data 221 selected from the list. Note that the accumulating print controller 21 requests the simulator part 13 to calculate the environmental burden value in association with the selected document data 221 before printing the document data 221. The simulator part 13 executes a process similar to that performed by the simulator part 13 of the first embodiment. The result display controller 14 displays the environmental burden reporting screen 520 on the operation panel based on a result of the process executed by the simulator part 13.

The environmental burden value may be calculated in the image forming apparatus 20 as described above.

Note that in the above embodiments, the information processing terminal 10 or the image forming apparatus 20 is an example of an information processing apparatus. The image forming apparatus 20 is an example of an apparatus. The device control operations part 12 or the accumulating print controller 21 is an example of a receiver. The simulator part 13 is an example of a calculator. The result display controller 14 is an example of a display controller. The print cost table is an example of a first storage part. The display cost table is an example of a second storage part.

Further, in the above embodiments, the image forming apparatus 20 is described as an example of the information processing apparatus. However, an apparatus other than the image forming apparatus 20 may be an example of the information processing apparatus. For example, any of the above embodiments may be applied to communication apparatuses, such as various types of smartphones including mobile phones or wearable computers, that are capable of performing various types of data communications. In such a case, the cost or the like may be calculated when data communication is performed in a specified communication carrier, and when data communication is performed in another communication carrier.

The embodiments may provide information in association with the cost or the environmental burden.

The embodiments of the present invention are described above. However, the present invention is not limited to the specifically disclosed embodiments, and variations and modifications may be made without departing from the scope of the present invention.

The present application is based on Japanese Priority Application No. 2013-256695 filed on Dec. 12, 2013, and Japanese Priority Application No. 2014-209826 filed on Oct. 14, 2014, the entire contents of which are hereby incorporated herein by reference.

What is claimed is:

1. An information processing apparatus comprising:
   a receiver configured to receive a print instruction, the print instruction instructing the information processing apparatus to print data via a first print condition including a specified printer apparatus to utilize to print the data;
   a processor configured to, calculate index values indicating one or more of costs and environmental burdens associated with printing the data based on a plurality of print conditions including at least the first print condition, a second print condition differing from the first print condition included in the print instruction and a third print condition associated with outputting the data via an apparatus differing from the specified printer apparatus, and generate a screen displaying the index values and buttons for executing printing based on respective ones of the plurality of print conditions; and a display controller configured to display the screen, and to receive an input, via selection of a corresponding one of the buttons, the input indicating a selected print condition of the plurality of print conditions to utilize when printing the print data, wherein the processor is configured to print the print data via the selected print condition.

2. The information processing apparatus as claimed in claim 1, wherein the processor is configured to calculate an index value associated with printing the data via the third print condition such that the data is output by the apparatus differing the specified printer apparatus.

3. The information processing apparatus as claimed in claim 1, further comprising:

a memory configured to store parameters for a plurality of models of apparatuses, the parameter being utilized to calculate the index values association with each of the plurality of print conditions, wherein the processor is configured to calculate respective ones of the index values using the parameters associated with the respective ones of the print conditions.

4. The information processing apparatus as claimed in claim 3, wherein the memory is further configured to store information indicating whether an output from each of the plurality of apparatuses are typically viewable by a single user, and the processor is configured to apply a multiplier to the index values that are based on ones of the plurality of print conditions associated with ones of the plurality of apparatuses whose output is typically viewable by a single user.

5. The information processing apparatus as claimed in claim 1, wherein the processor is configured to, calculate a first index value associated with printing the data based on the first print condition specified by the print instruction, and calculate a second index value associated with printing the data based on the second print condition, the second print condition instructing the information processing apparatus to output the data to a display device.

6. The information processing apparatus as claimed in claim 1, wherein the index values indicating the environmental burden include an indication of one or more of power consumption and $CO_2$ emissions associated with printing the print data using respective ones of the plurality of print conditions.

7. The information processing apparatus as claimed in claim 1, wherein the display controller display the index values indicating the costs or the environmental burdens on the screen.

8. An information processing method comprising:

receiving a print instruction, the print instruction instructing an information processing apparatus to print data via a first print condition including a specified printer apparatus to utilize to print the data;

calculating index values indicating costs or environmental burdens when the data is printed based on a plurality of print conditions including at least the first print condition, a second print condition differing from the first print condition included in the print instruction, and a third print condition associated with outputting the data via an apparatus differing from the specified printer apparatus;

generating and displaying a screen displaying the index values and buttons for executing printing based on respective ones of the plurality of print conditions;

receiving an input, via selection of a corresponding one of the buttons, the input indicating a selected print condition of the plurality of print conditions to utilize when printing the print data; and printing the print data via the selected print condition.

9. The information processing method as claimed in claim 8, wherein the calculating index values includes calculating an index value associated with printing the data via the third print condition such that the data is output by the apparatus differing the specified printer apparatus.

10. The information processing method as claimed in claim 8, further comprising:

storing parameters for a plurality of models of apparatuses, the parameter being utilized to calculate the index values association with each of the plurality of print conditions, wherein the calculating index values includes calculating respective ones of the index values using the parameters associated with the respective ones of the print conditions.

11. The information processing method as claimed in claim 10, further comprising:

storing information indicating whether an output from each of the plurality of apparatuses are typically viewable by a single user; and applying a multiplier to the index values that are based on ones of the plurality of print conditions associated with ones of the plurality of apparatuses whose output is typically viewable by a single user.

12. The information processing method as claimed in claim 8, wherein the calculating index values comprises:

calculating a first index value associated with printing the data based on the first print condition specified by the print instruction; and calculating a second index value associated with printing the data based on the second print condition, the second print condition instructing the information processing apparatus to output the data to a display device.

13. The information processing method as claimed in claim 8, wherein the index values indicating the environmental burden include an indication of one or more of power consumption and $CO_2$ emissions associated with printing the print data using respective ones of the plurality of print conditions.

14. The information processing method as claimed in claim 8, wherein the generating and displaying displays the index values indicating the costs or the environmental burdens on the screen.

15. A non-transitory computer readable medium comprising instructions that, when executed by a processor, configure the processor to, receive a print instruction, the print instruction instructing an information processing apparatus to print data via a first print condition including a specified printer apparatus to utilize to print the data, calculate index values indicating costs or environmental burdens when the data is printed based on a plurality of print conditions including at least the first print condition, a second print condition differing from the first print condition included in the print instruction and a third print condition associated with outputting the data via an apparatus differing from the specified printer apparatus, generate and display a screen displaying the index values and buttons for executing printing based on respective ones of the plurality of print conditions, receive an input, via selection of a corresponding one of the buttons, the input indicating a selected print condition of the plurality of print conditions to utilize when printing the print data; and print the print data via the selected print condition.

* * * * *